United States Patent [19]  
Kylin et al.

[11] 3,786,251  
[45] Jan. 15, 1974

[54] BULK MATERIAL NUCLEAR MOISTURE GAUGING SYSTEM

[75] Inventors: Donald H. Kylin; Thomas E. Reim, both of Cleveland Heights, Ohio

[73] Assignee: Republic Steel Corporation, Cleveland, Ohio

[22] Filed: Feb. 2, 1972

[21] Appl. No.: 222,967

Related U.S. Application Data

[63] Continuation-in-part of Ser. No. 34,730, May 5, 1970, abandoned.

[52] U.S. Cl........ 250/43.5 D, 250/83.1, 250/83.3 D
[51] Int. Cl..................... G01n 23/12, G01t 3/00
[58] Field of Search.................. 250/43.5 D, 83.3 D, 250/83.1

[56] References Cited  
UNITED STATES PATENTS  
3,435,217   3/1969   Givens .............................. 250/83.1  
3,529,160   9/1970   Moran .............................. 250/83.1

Primary Examiner—Archie R. Borchelt  
Attorney—Robert P. Wright et al.

[57] ABSTRACT

An improvement on a moisture gauging system of the type disclosed in Stone et al. U.S. Pat. No. 3,431,415, issued Mar. 4, 1969, in which slow neutrons are sensed to provide an indication of the moisture and other neutron interacting material content of an irradiation volume of a substance. A compensation circuit is provided to counteract the effect of neutron interacting material in the substance under test.

6 Claims, 5 Drawing Figures

BULK MATERIAL NUCLEAR MOISTURE GAUGING SYSTEM

CROSS REFERENCE TO RELATED APPLICATION

This application is a continuation-in-part of our co-pending application Ser. No. 34,730, filed May 5, 1970 for Nuclear Gauging System, now abandoned.

BACKGROUND AND BRIEF DESCRIPTION OF THE INVENTION

This invention relates to a nuclear moisture gauge. There is disclosed herein an improvement on a bulk material moisture gauging system of the type disclosed in Stone et al. U.S. Pat. No. 3,431,415, issued Mar. 4, 1969. The bulk material mositure gauging system disclosed in the aforesaid patent comprises a source of fast neutron and gamma radiation for irradiation of a cross-sectional volume of a bulk substance.

The improvement herein permits application of the previously described system to the measurement of the moisture content of materials having neutron interacting elements in addition to water, whether such material moves in a stream of irregular and varying cross-section or whether such stream of material has a regular cross-section. A circuit is provided which produces the correction which is needed in compensating for the extra neutron-moderating effects produced by neutron collision with elements such as carbon which could interact (moderate or absorb) with the neutron flux to produce an erroneous measurement of moisture.

The invention of the above application was conceived in connection with the gauging of the moisture content of metallurgical coke. It is, however, equally adapted to the measurement of moisture in other substances; to mention only a few of them: moisture in cereal, moisture in coal, moisture in sugar, moisture in plastics, moisture in limestone, and moisture in paper pulp.

Moreover, the number of neutron interacting elements which can introduce errors into the gauge output are numerous. They include, among others, hydrogen, deuterium, helium, lithium, beryllium, carbon, oxygen, uranium and iron.

For background in consideration of the present invention, reference should be made to the aforenoted system described in U.S. Pat. No. 3,431,415, assigned to the assignee of the present invention. That patent describes a nuclear moisture gauge for measuring, indicating and controlling the moisture in moisture containing solids. As stated, that invention was developed and applied to the measurement and control of moisture in sinter mix materials as they are transported on a conveyor belt, and it has been applied to a variety of such materials. However, it has been found that in the case of metallurgical coke or other highly carbonaceous material, as well as other materials with which neutrons may interact, accurate measurements of moisture content are not obtainable due to the fact that correction is needed in order to compensate for the fact that the carbon contained in coke or other highly carbonaceous material and similar neutron interacting materials produces extra neutron-moderating effects. Without such compensation the signal obtained from the neutron detector will be in error because the interacting materials present in coke, or like material, act to slow the neutrons in the same way as the hydrogen present in water, thereby giving an erroneous indication of moisture content — which is the desired parameter being measured.

Accordingly, it is a primary object of the present invention to enable accurate measurement and indication of the moisture content, by weight percentage, of substances containing significant quantities of neutron interacting materials.

A presently preferred embodiment of the invention is incorporated in a system of the type shown in U.S. Pat. No. 3,431,415, i.e., in a moisture gauging system utilizing a source of fast neutron and gamma radiation for irradiation of a cross-sectional volume of a bulk substance. There is provided in the system a slow neutron responsive means responsive to slow neutrons from the cross-sectional volume irradiated by neutrons for deriving a first electrical control energy varying with the moisture content of an irradiation volume of the substance, gamma responsive means positioned to receive gamma radiation which emanates from the source and traverses a volume irradiated by gamma radiation for deriving a second electrical control energy varying with the mass of the substance in an irradiation volume thereof, and means jointly responsive to the first and second electrical control energies for obtaining the ratio existing between said first and second control energies and for generating an output signal proportional to the weight percentage moisture content of said substance. In such a system there is included, in accordance with the present invention, means for compensating for the presence of neutron interacting elements in the bulk substance other than the hydrogen of the water content.

DETAILED DESCRIPTION

Figure 1:
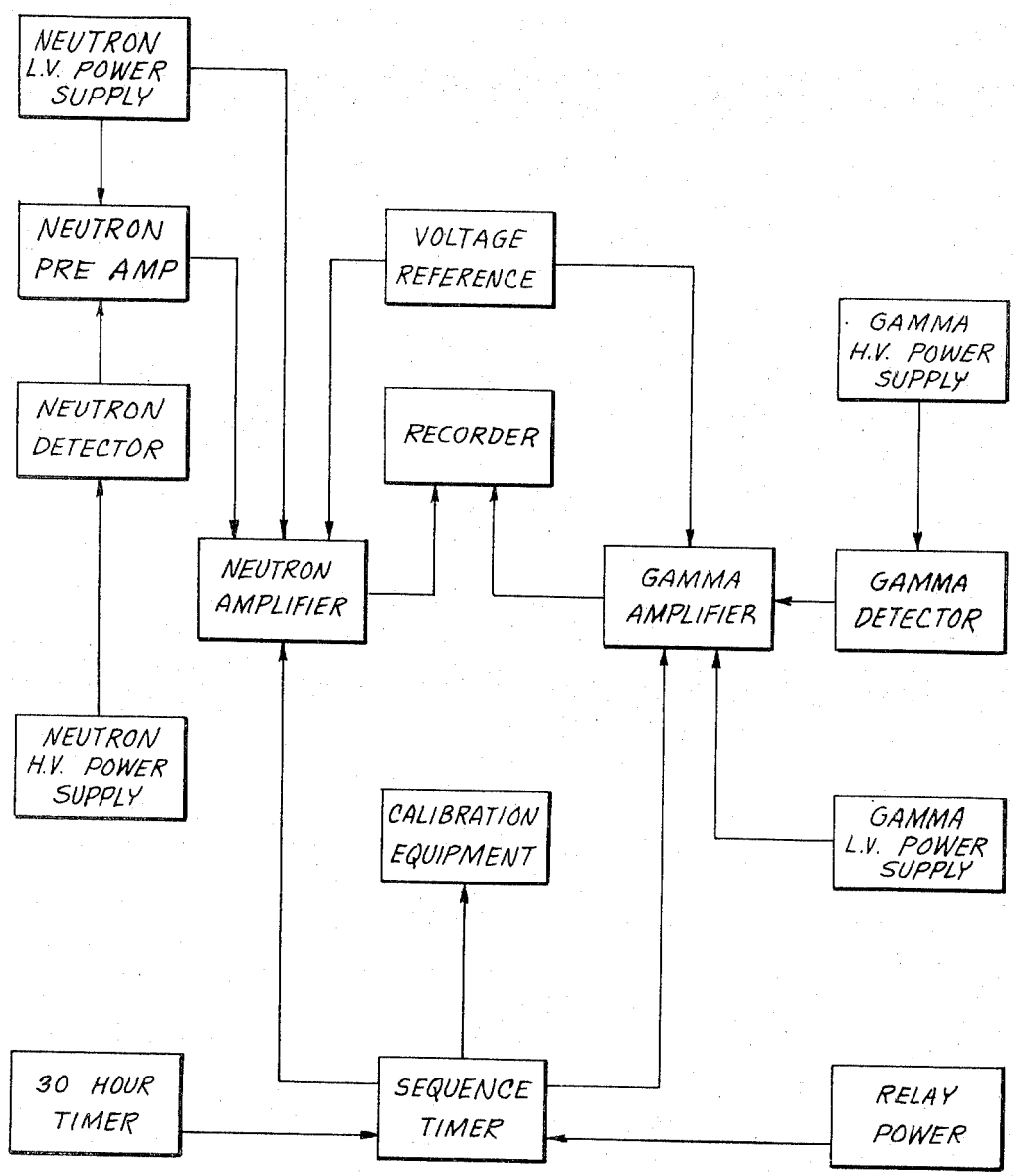
FIG. 1 is a block diagram of the nuclear moisture gauge of U.S. Pat. No. 3,431,415.

In FIG. 1 of the drawings, there is depicted a block diagram of the nuclear moisture gauge previously disclosed in U.S. Pat. No. 3,431,415, assigned to the assignee of the present invention. FIG. 1 herein is the same as FIG. 2 of the patent. Reference may be made to that patent for a detailed description of such gauge and an associated moisture control system.

Briefly considered, the gauge shown in FIG. 1 comprises a neutron detector and a gamma detector so designed and interconnected as to produce an output signal proportional to the weight percentage moisture content of the material being measured substantially independently of the geometry of the material in the stream of material being gauged. The gamma detector detects any changes in the weight of the material, while the neutron detector detects moisture changes directly by measuring the slowing of neutrons which have irradiated the material. Means are provided jointly responsive to the electrical control energies resulting from the neutron detection and the gamma detection so as to obtain the ratio existing between the two control energies.

Figure 2:
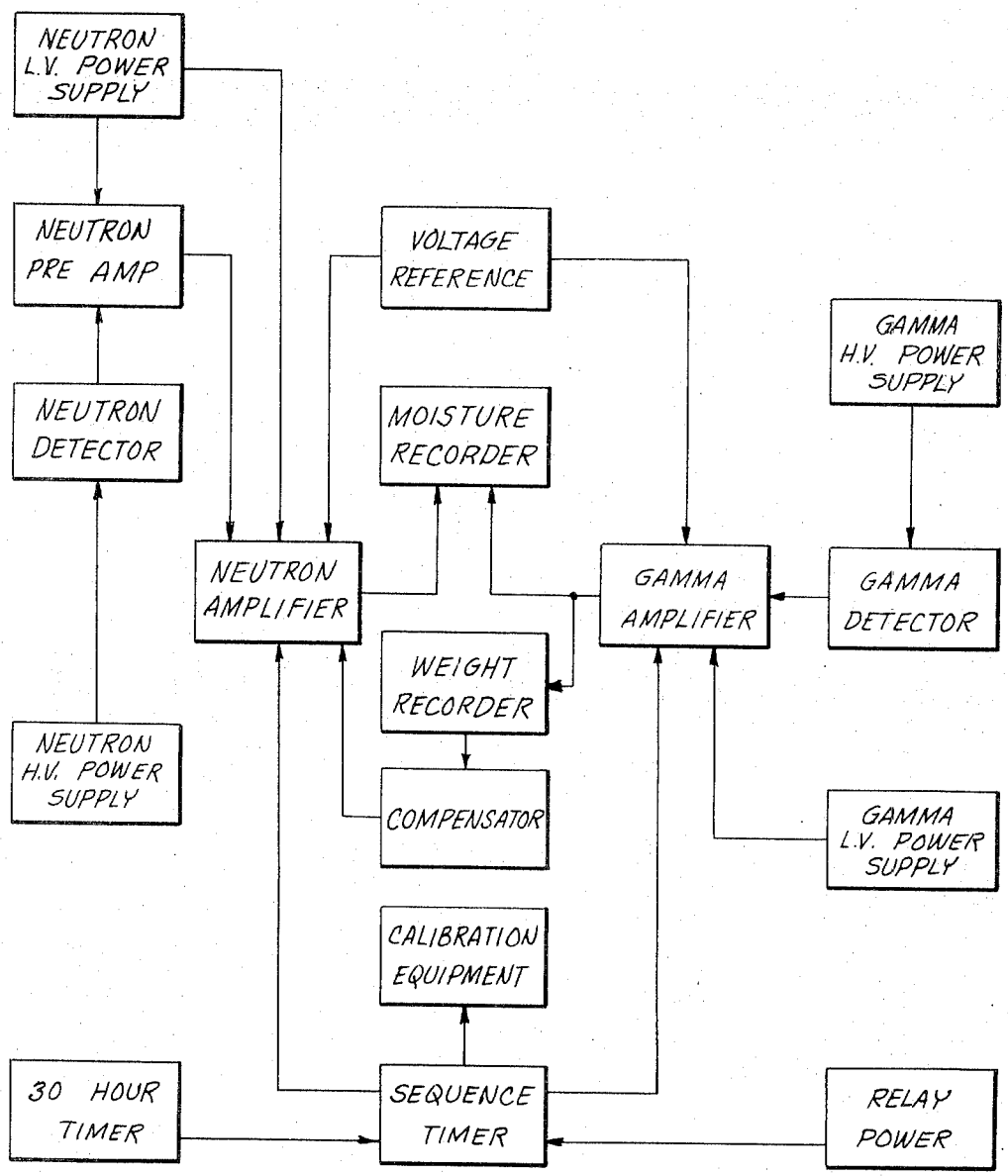
FIG. 2 is a block diagram of an improved nuclear moisture gauge which compensates for neutron interacting elements in accordance with the present invention.

FIG. 2 is a block diagram of an improved nuclear moisture gauge. The gauge shown in FIG. 2 comprises the gauge just described and a new compensator circuit for neutron interacting elements. The neutron detector detects both moisture change and weight changes of the neutron interacting elements directly by measuring the slowing of neutrons which have irradiated the material. The neutron amplifier is made non-responsive to the weight changes of the neutron interacting elements by introducing a compensation signal derived from the gamma detection and representative of mass. Means are provided jointly responsive to the electrical control energies resulting from the detection as compensated and the gamma detection so as to obtain the ratio existing between the two control energies.

Figure 3:
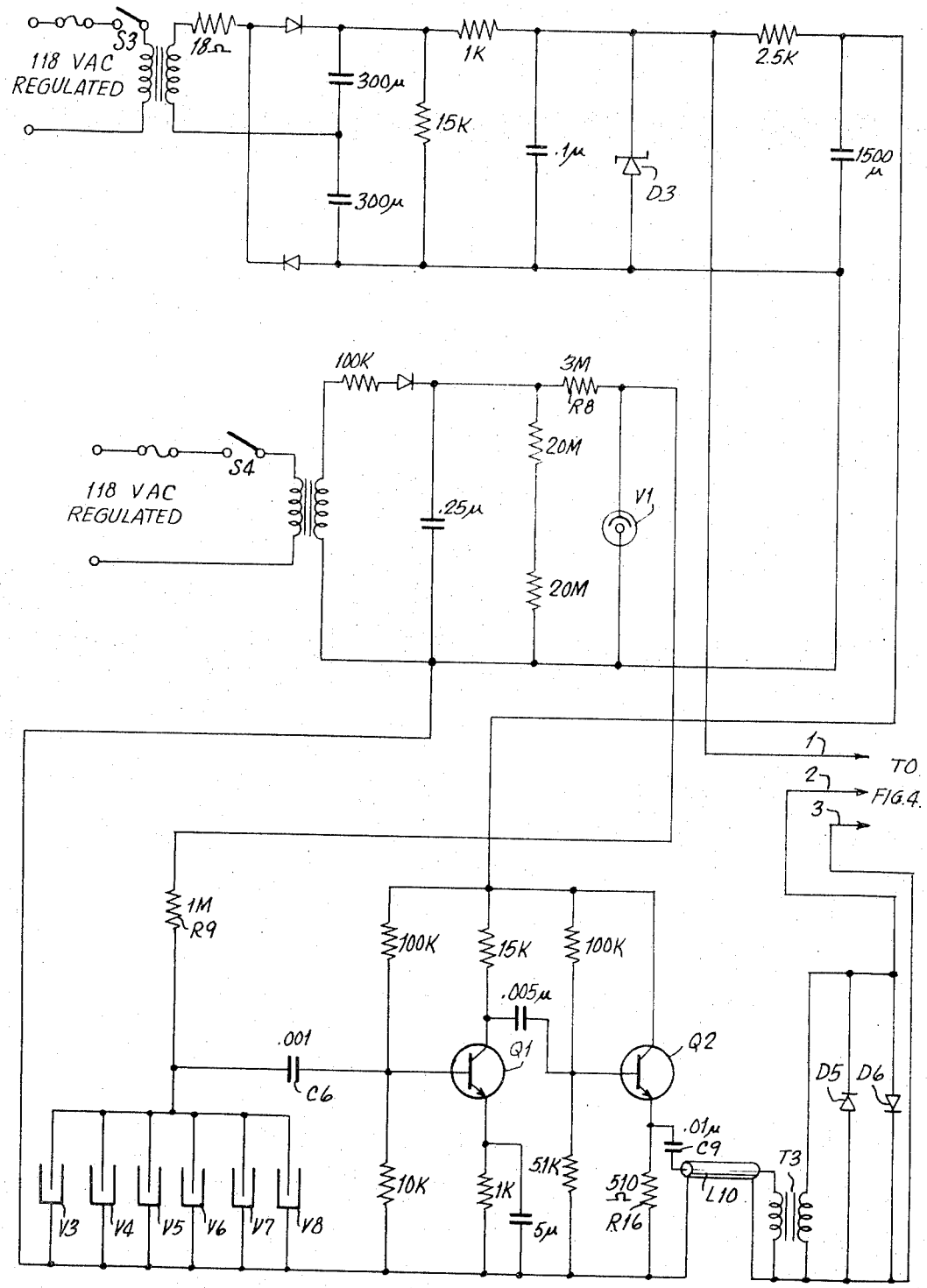
FIGS. 3, 4 and 5, taken together, comprise a schematic diagram of a circuit embodying the present invention.
Figure 4:
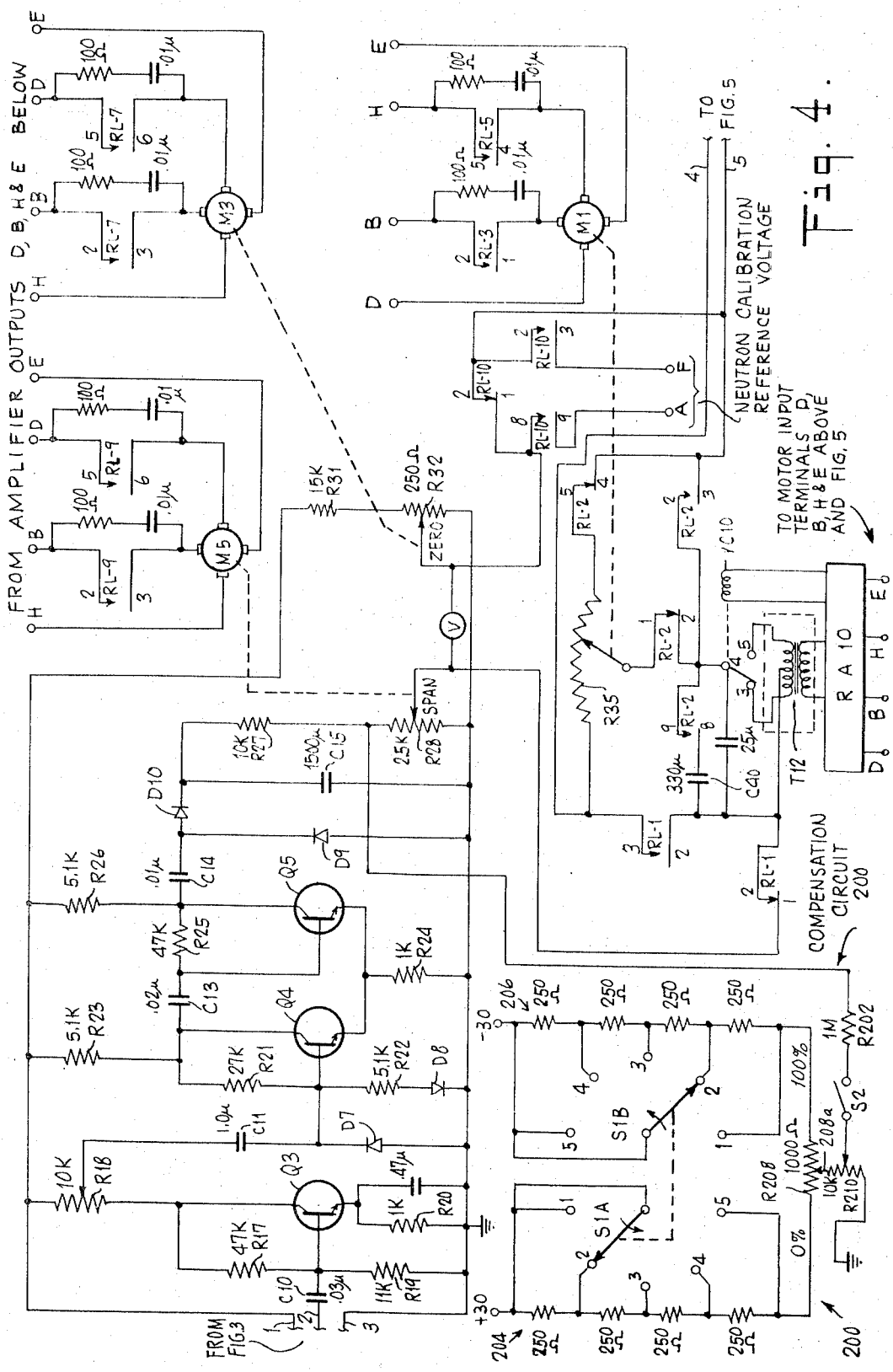
Figure 5:
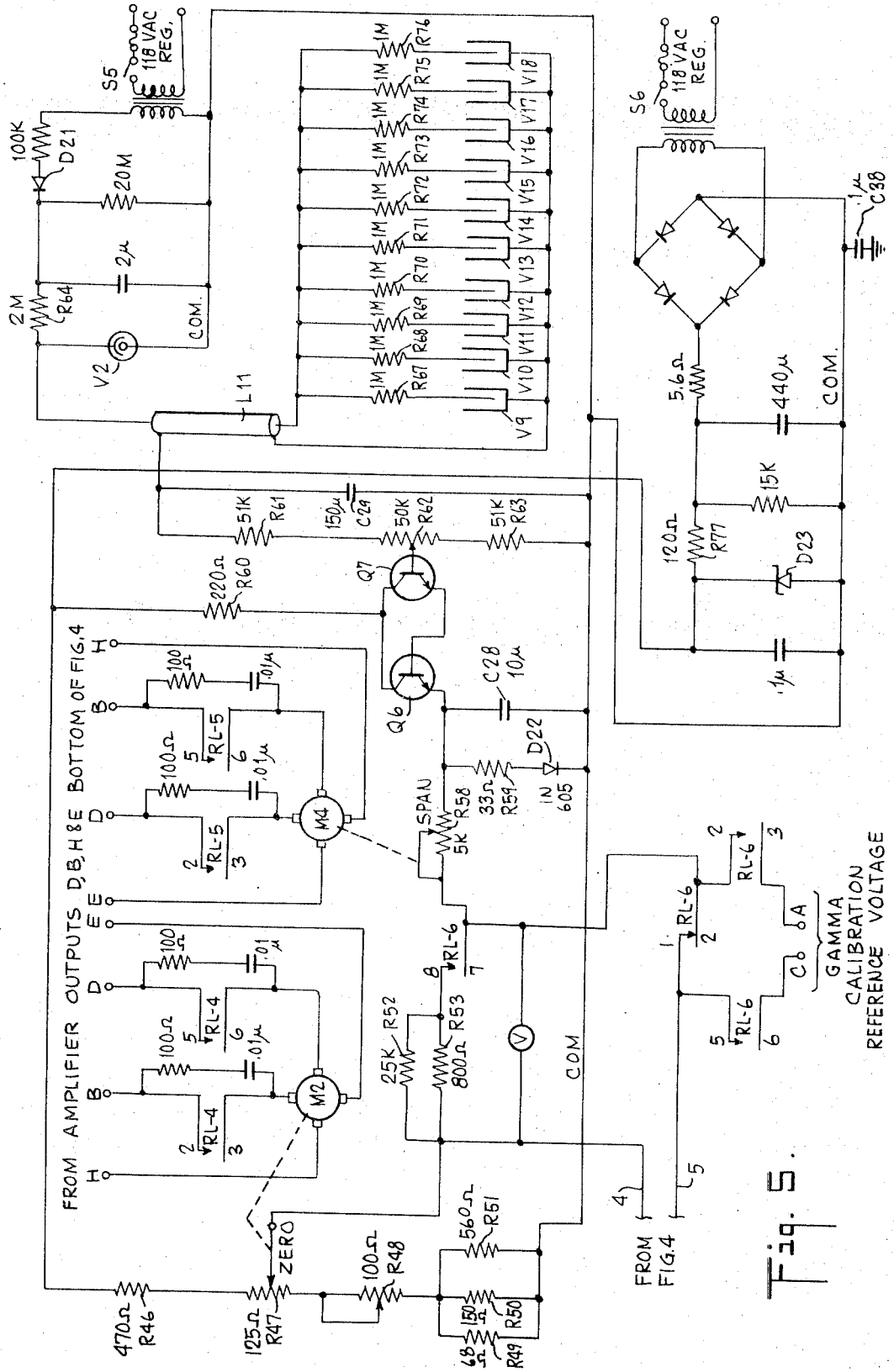

The invention herein is most readily understood by first considering the neutron detector and amplifier and the gamma detector and amplifier, as shown in FIGS. 3, 4 and 5. The circuits shown in FIGS. 3, 4 and 5 are the same as those shown respectively in FIGS. 10, 11 and 12 of U.S. Pat. No. 3,431,415, except for the additon of compensation circuit 200 of FIG. 4. While reference may be made to the patent for the details of the common features of the circuits, the following explanation is given both to simplify understanding of all features and to explain the operation of the compensation circuit 200.

As shown very clearly in FIG. 3, the neutron detector includes a group of six boron trifluoride proportional counter tubes V3–V8 having anodes and cathodes connected in parallel and energized through a resistor R9 of relatively large value from a unidirectional high voltage power supply system. The latter is of conventional half-wave rectification type, and is regulated by inclusion in its output circuit of a series regulating resistor R8 and a shunt-connected regulating tube V1. The resistor R9 provides constant-current limiting for the neutron detector tubes, and also provides for the latter a load resistor across which potential pulses are developed when the neutron detectors are subjected to slow neutron bombardment. The number of potential pulses developed by the neutron detector tubes across the resistor R9, in response to the slow neutron bombardment of the detector tubes, is proportional to the quantities of moisture and neutron interacting elements in the material being gauged with different constants of proportionality. These slow neutrons which pass the detector tubes without being detected are reflected back to the neutron tubes by carbon blocks (not shown) mounted under the tubes.

The neutron detector tubes V3–V8 are insensitive to fast neutrons, but do produce relatively small amplitude potential pulses across the resistor R9 in response to gamma radiation. As will presently be explained more fully, the effect of these small potential pulses is nullified by an amplitude limiting characteristic provided in the neutron amplifier hereinafter described.

The voltage pulses developed by the neutron detector tubes V3–V8, across the resistor R9, are coupled through a condenser C6 to the base electrode of a transistor Q1 included in the first stage of a conventional two-stage alternating-current transistor preamplifier. This amplifier is energized from a low-voltage full-wave rectifier system, shown at the top of FIG. 3, having its output voltage regulated by a Zener diode device D3. The second amplifier stage includes a transistor Q2 operating as an emitter-follower arrangement by reason of the direct connection of its collector electrode to the low-voltage energizing source and by use of an unbypassed resistor R16 in its emitter electrode circuit. The transistor preamplifier amplifies the potential pulses developed across the resistor R9 of the neutron detector tubes V3–V8, and the amplified potential pulses developed across the emitter resistor R16 of the second stage are coupled through a condenser C9 and a coaxial cable L10 to the primary winding of a transformer T3. The emitter resistor R16 has a value of resistance selected in conventional manner to match the output driving impedance of the preamplifier second transistor stage to the input impedance of the cable L10, which has its impedance also matched to the input impedance of the primary winding of the transformer T3.

The secondary winding of the transformer T3 is coupled through a condenser C10 (FIG. 4) to the base electrode of a transistor Q3, employed as the first stage of a two-stage neutron transistor amplifier, to apply the output potential pulses of the tranformer T3 as negative-polarity pulses to the base electrode. The first transistor stage includes a collector load resistor comprised by the resistive element of a potentiometer R18 across which amplified positive-polarity potential pulses are developed. The base electrode of the transistor Q3 is conventionally biased as shown by a degenerative bias arrangement including a potential divider comprised by series-connected resistors R17 and R19 connected from the collector electrode of the transistor Q3 to ground. The transistor Q3 is protected from excessive-amplitude input voltage pulses by diode rectifier devices D5 and D6 connected with opposite conductive polarities across the secondary winding of the transformer T3.

The second stage of the neutron amplifier provides pulse amplification and wave shaping, and is a conventional monostable multivibrator which includes transistor devices Q4 and Q5 utilizing a common emitter resistor R24 and having the collector electrode of the transistor Q4 coupled through a condenser C13 to the base electrode of the transistor Q5. The base electrode of the transistor Q5 is biased by a resistor R25 to a potential which normally renders the transistor Q5 conductive, and the resultant potential produced across the emitter resistor R24 by the conductive current of the transistor Q5 biases the transistor Q4 to a normally non-conductive state. The multivibrator arrangement has its operational characteristics conventionally stabilized by use of a compensating diode rectifier D8 serially included in the degenerative base-bias potential divider comprised by the series resistors R21 and R22. The base electrode of the multivibrator transistor Q4 is coupled through a condenser C11 to the movable contact of the potentiometer R18, which may be manually adjusted to select a desired porportionate part of the amplified pulse voltages developed across the potentiometer resistive element by the transistor Q3 of the first amplifier stage. A diode rectifier device D7 is connected, with the conductive polarity shown, between the base electrode of the multi-vibrator transistor Q4 and ground potential to provide bias stabilization.

Manual adjustments of the adjustable contact of the potentiometer R18 enables the input circuit of the transistor Q4 to discriminate against the lower amplitude potential pulses produced by gamma radiation of the neutron detector tubes v3–V8. In particular, the pulse amplitude discrimination thus effected by adjustment of the potentiometer R18 is such that only the amplified neutron potential pulses developed by the neutron detector tubes V3–V8 have sufficient amplitude to operate the monostable multivibrator, comprising transistors Q4 and Q5, through a cycle of its operation.

Each cycle of operation of the transistor multivibrator just described produces a short-duration positive potential pulse across a load resistor R26 included in the collector electrode circuit of the transistor Q5. These potential pulses are coupled through a condenser C14 to a pulse integrating circuit comprised by a shunt-connected diode D9 and a series-connected diode D10, having the conductive polarities shown, and including an output-circuit shunt condenser C15 and shunt resistive potential divider comprised by a resistor R27 connected in series with the resistive element of a span potentiometer R28. The circuit values of this output circuit are selected to provide a time constant such that the potential output pulses of the multivibrator are so integrated in the output circuit as to produce across the potentiometer R28 an output unidirectional voltage having a value varying linearly with the rate of the neutron detector pulses applied through the input transformer T3 to the neutron transistor amplifier.

The unidirectional voltage across R28 varies linearly with the rate of the neutron detector pulses when switch S2 is open, that is, when the compensator is not active. When the compensator is activated by closing switch S2, the voltage across R28 is increased or decreased by an amount proportional to the position of the sliding contact of retransmitting slidewire R208. The action of the compensator will presently be explained more fully.

A proportionate part of this unidirectional potential, selected by the adjusted position of the movable contact of the span-potentiometer R28, is compared against a zero reference value of unidirectional potential selected by the adjusted position of a potentiometer R32 having its resistive element serially connected with a resistor R31 across the source of unidirectional voltage which energizes the neutron amplifier. In particular, the span-potentiometer and zero-reference potentiometer voltages have like polarity with respect to ground potential and are applied in series opposing relation with one another to the input circuit of a recorder amplifier RA-10. This input circuit includes an input transformer T12 having a secondary winding connected to the input circuit of the recorder amplifier RA-10 and having a center tapped primary winding with the center tap thereof connected through the normally closed contacts 1 and 2 of a calibrating relay RL1 to the movable contact of the span-potentiometer R28. The end terminals of the primary winding of the input transformer T12 are connected to the stationary contacts of a vibrator, these contacts being alternately engageable by the vibrator movable contact which is actuated by sixty cycle electrical energization of a vibrator energizing winding VC10 from a low voltage energizing circuit of the recorder amplifier RA-10. The movable contact of the vibrator is connected through the normally closed contacts 1 and 2 of a calibrating relay RL-2 to the movable contact of a recorder slide wire potentiometer R35 having an end terminal connected as shown through normally closed contacts 4 and 5 of the relay RL-2 and normally closed contacts 1 and 2 of a calibrating relay RL-10 to the movable contact of the zero-reference potentiometer R-32.

The gamma detector includes a group of 10 halogen quenched geiger tubes V9–V18 (FIG. 5) which are individually energized through respective resistors R67–R76 from a regulated high voltage power supply system. This power supply system is of conventional half-wave rectification type having a series regulating resistor R64 and shunt regulating tube V2, and has its positive output terminal connected through the central conductor of a coaxial transmission line L11 to the resistors R67–R76 for positive energization of the centrally positioned coaxial electrode of the respective geiger tubes V9–V18. The outer concentric electrodes of these tubes are connected in common to the negative terminal of the high voltage supply system through a series circuit which includes the outer concentric conductor of the transmission line L11 and a condenser C29, the latter having connected in parallel thereto a series resistive circuit including a resistor R61, the resistive element of a potentiometer R62, and a resistor R63. The geiger tubes V9–V18 are physically positioned to survey approximately the same detection area as is surveyed by the neutron detection tubes V3–V8 earlier considered, and voltage pulses are produced across the condenser C29 and resistors R61– R63 by the geiger tubes V9–V18 when the latter are subjected to gamma radiation. The number of voltage pulses so produced per unit of time is proportional to the amount of radiation passing through the material on the conveyor belt. Since the density of any given material is substantially constant, the number of voltage pulses produced across the condenser C29 and resistors R61–R63 by the geiger tubes V9–V18 is inversely proportional to the weight of the material on the conveyor belt.

The voltage pulses produced by the geiger tubes V9–V18 are integrated by the resistive-capacitive network comprised by the condenser C29 and resistors R61–R63 to produce across the potentiometer R62 and resistor R63 a unidirectional voltage having a value proportional to the number of voltage pulses produced by the geiger tubes V9–V18 per unit of time. The movable contact of the potentiometer R62 may be manually adjusted along the length of the potentiometer resistive element to select and apply to the base electrode of a transistor Q7 a fractional part of the unidirectional voltage developed by integration across the potentiometer R62 and resistor R63. The transistor Q7 is included with a transistor Q6 in a conventional two-stage compound-connected transistor amplifier in which the collector electrodes of the transistors Q6 and Q7 are energized through a resistor R60 from a conventional full-wave power supply system having its output regulated by a shunt zener device D23 and a series resistor R77.

The emitter electrode of the transistor Q7 is directly connected to the base electrode of the transistor Q6, and the emitter electrode of the latter is connected to ground potential through a resistor R59 and a stabilizing series diode rectifier D22. The transistor Q6 operates as an emitter-follower amplifier stage to develop across the emitter resistor R59 and diode D22 the amplified unidirectional voltage applied to the base electrode of the transistor Q7, a condenser C28 being connected in shunt to the emitter resistor R59 and diode D22 to bypass any significant alternating-current frequency components appearing in the amplified output voltage.

The amplified unidirectional output voltage of the transistor stage Q6 is supplied through an adjustable span resistor R58, normally closed contacts 1 and 2 of a calibration relay RL-6, and the normally closed contacts 4 and 5 of the relay RL-2 (FIG. 4) to one terminal of the resistive element of the recorder slide wire potentiometer R35 as shown. The opposite terminal of the resistive element of the potentiometer R35 has a zero reference voltage applied to it from the adjustable contact of a zero reference potentiometer R47 (FIG. 5) which is connected with a fixed resistor R46, an adjustable resistor R48, and parallel connected resistors R49-R51 across the source of unidirectional voltage which energizes the compound transistor amplifier just described. The zero reference voltage thus applied to one end terminal of the recorder slide wire potentiometer R35 has the same positive polarity with respect to ground potential as does the amplified unidirectional output voltage applied to the other terminal of the potentiometer R35 by the compound transistor amplifier comprised by the transistors Q6 and Q7. Thus the net voltage developed across the recorder slide wire potentiometer R35 corresponds to the prevailing difference between the zero reference voltage and the amplified output voltage of the gamma detector amplifier.

The automatic recalibration of the neutron and gamma detectors just described can be accomplished in the manner described in U.S. Pat. No. 3,431,415 (see Col. 6 thereof). The compensator offset switch S1 (FIG. 4 herein) comprising sections S1A and S1B and the compensator span potentiometer R210 are adjusted during initial calibration of the system. They are not a part of the automatic calibration system of U.S. Pat. No. 3,431,415. Controls S1 and R101 are set at the same time as the two calibration reference voltages (potentiometers R41 and R42, FIG. 17 of U.S. Pat. No. 3,431,415). The settings of S1, R210, R41 and R42 depend on the normal material weight and moisture, the type of conveyor belt, and the material being gauged at a particular installation of this invention.

Referring specifically to FIG. 4, it will be noted that the compensation circuit in accordance with the present invention appears in the lower left corner thereof. This compensation circuit is designated 200 and is constructed to enable accurate measurement of moisture content despite the fact that carbonaceous and/or other neutron interacting materials are involved. In other words, the compensation circuit is used when the material to be gauged includes neutron interacting elements other than the hdyrogen in the moisture such as metalurgical coke, or the like, to adapt the gauging system to compensate for the error that is introduced by the presence of the interacting elements, such as carbon, or the like.

It will be seen that the upper end of the neutron span potentiometer R28 is connected to the compensation circuit through resistor R202 forming a part thereof. The switch S2 is used to include the compensation circuit when desired, that is, when carbonaceous material or other neutron interacting material is present.

The compensation circuit 200 comprises a voltage divider network having two legs 204 and 206 connected to a weight recorder retransmitting slidewire potentiometer designated R208, a switch designated S1, a span adjusting potentiometer designated R210, and coupling resistor R202 and coupling switch S2. Each of the legs 204 and 206 comprises a group of resistors serially connected. The ends of 204 and 206 not connected to R208 are connected to potential supplies of typical values plus 30 volts and minus 30 volts respectively. The weight recorder (not shown) responds to the output of the gamma amplifier and contains appropriate zero and span adjustments. The weight recorder span and zero adjustments are set such that the sliding contact 208a is at 0% when no material is being gauged and at 100% when a maximum amount is being gauged. In other words, the setting of the potentiometer R208 varies with the mass of the gauged material.

The resistors in legs 204 and 206 are selected to have a value of approximately 250 ohms each. A slidewire potentiometer R208 has a value of approximately 1,000 ohms.

The basic compensator signal is developed at the slide contact 208a of the slidewire potentiometer R208. It is evident that this signal becomes more negative in direct relation to the increase in neutron interacting material weight in the gauging zone. As will be explained more fully, this compensator signal offsets the portion of the neutron detector signal that becomes more positive with increasing neutron interacting material weight.

The switch S1 forming part of the compensator is a two-section device, the sections being designated S1A and S1B. The mechanical linkage between the two switch sections is shown by the dash line on the drawing.

It will be evident that the electrical zero point of the compensator output is determined by the switch S1 and that in any position of switch S1 the output will become more negative as the material mass increases. The correlation between the position of switch S1 and the percentage of weight span for zero compensation will be seen from the following table:

| S1 POSITION | PERCENT OF WEIGHT SPAN FOR ZERO COMPENSATION |
| --- | --- |
| 1 | 0 |
| 2 | 25 |
| 3 | 50 |
| 4 | 75 |
| 5 | 100 |

To verify the table let it be assumed that the switch S1 is placed in the first position; that is, that the movable contacts of the sections S1A and S1B are both touching their respective fixed contacts 1, then none of the resistors in leg 204 is shorted out by section S1A, whereas all of the sections in leg 206 are shorted out. Consequently, a negative potential of −30 volts extends at the right hand end of the slide wire resistor. Therefore, the electrical zero point is at the left end of the slide wire resistor.

At the other extreme position, that is, position 5 for the switch S1, the electrical zero point will be at the right end of the slide wire resistor. At the intermediate switch positions, of course, the zero point will be at proportionate locations.

A fraction of the aforementioned compensator output signal developed at the contact 208a is taken from the sliding contact of the compensator span control potentiometer R210. When the switch S2 is placed in the closed position the signal taken from the sliding contact of the potentiometer R210 is transmitted via resistor R202 and is combined at the potentiometer R28 with the signal from the neutron amplifier. The latter signal represents the moisture content but includes an erroneous component due to the neutron interacting atoms present in the material being gauged. However, the resultant signal at the sliding contact of R28 represents the true value of moisture content since it has been compensated for such erroneous component.

In order to calibrate the compensation circuit 200 the control S1 is initially set for zero compensation at the normal operating weight span. A typical run of dry material is made and R210 is adjusted with S2 closed to remove the signal at R28 due to the atoms moderating the neutrons. Further refinements to the setting of R210 can be made at normal moisture levels.

Having made the above-described calibration, the setting of potentiometer R210 remains valid even though the moisture content of the mix varies. This is so because the error introduced by the neutron interacting material is a fixed fraction of the material weight. The carbon in metallurgical coke, for example, is about 95 percent of the total weight of the material. However, should the percentage of neutron interacting material in the mix differ significantly from the above, the compensation network would be recalibrated.

It is to be understood that although this invention has been described in terms of a representative, presently preferred embodiment thereof, modifications will be apparent to those skilled in the art. The invention should be taken to be defined by the following claims.

We claim:

1. A moisture gauging system for irradiation of a cross-sectional volume of a bulk substance, slow neutron responsive means responsive to slow neutrons from said cross-sectional volume irradiated by neutrons for deriving a first electrical control energy varying with the moisture and other neutron interacting material content of an irradiation volume of said substance, gamma responsive means positioned for irradiation by gamma radiation for deriving a second electrical control energy varying with the mass of said substance in an irradiation volume thereof, means jointly responsive to said first and second electrical control energies for obtaining the ratio existing between said first and second control energies and for generating an output signal proportional to the weight percentage moisture content of said substance sustantially independently of the geometry of the material in the stream of material being gauged, and means for compensating for the presence of neutron interacting material besides water in said bulk substance comprising a compensation circuit responsive to said gamma responsive means and selectively connectable to said slow neutron responsive means.

2. A system according to claim 1 in which said compensating means comprises a voltage divider network for providing a compensating signal sufficient to compensate for the error component of the signal from said slow neutron responsive means.

3. A system according to claim 2, further including a plurality of resistors, a source of positive potential, a source of negative potential, and means providing an output signal which varies selectively more toward one polarity as the mass of the substance increases.

4. In a moisture gauging system for irradiation of a cross-sectional volume of a bulk substance, and including slow neutron responsive means responsive to slow neutrons from said cross-sectional volume irradiated by neutrons for deriving a first signal varying with the moisture and other neutron interacting material content of an irradiation volume of said substance, the combination therewith of gamma responsive means positioned for and responsive to irradiation by gamma radiation for deriving a second signal varying substantially only in accordance with the mass of said substance in an irradiation volume thereof, and means for summing said first and second signals to produce a composite signal representative substantially only of the moisture content of said irradiation volume.

5. A system according to claim 4, in which the second signal is made to vary in a sense to reduce the composite signal for changes in said second signal respresenting increases in the mass of said substance of said irradiation volume.

6. A system according to claim 4, in which said substance is carbonaceous material, and said gamma responsive means is responsive to the presence of carbon in said carbonaceous material.

* * * * *